United States Patent [19]

Parker

[11] Patent Number: 4,803,858
[45] Date of Patent: Feb. 14, 1989

[54] GARDEN HOSE PROTECTOR

[76] Inventor: Frank I. Parker, 5701 Grand Ave. South, Minneapolis, Minn. 55419

[21] Appl. No.: 180,358

[22] Filed: Apr. 11, 1988

[51] Int. Cl.$^4$ .............................................. F16B 41/00
[52] U.S. Cl. ....................................... 70/231; 70/232; 70/178
[58] Field of Search ................. 70/232, 231, 229, 230, 70/178, 179, 180; 285/83, 80

[56] References Cited

U.S. PATENT DOCUMENTS

| 619,795 | 2/1899 | Schreiner | 70/232 |
| 725,290 | 4/1903 | Speer | 70/232 |
| 779,032 | 1/1905 | Draudt . | |
| 785,526 | 3/1905 | Simpson . | |
| 795,952 | 8/1905 | Angeloni et al. . | |
| 804,387 | 11/1905 | Davis . | |
| 2,048,424 | 7/1936 | Caldwell . | |
| 2,163,955 | 6/1939 | McWalters . | |
| 2,565,659 | 8/1951 | Kontra | 70/232 |
| 3,362,426 | 1/1968 | Polit et al. . | |
| 3,380,267 | 4/1968 | Winchester | 70/232 |
| 3,678,717 | 7/1972 | Eaton . | |
| 4,541,256 | 9/1985 | Green . | |

FOREIGN PATENT DOCUMENTS 18085 of 1914 United Kingdom ................. 70/232

Primary Examiner—Robert L. Wolfe
Attorney, Agent, or Firm—Paul L. Sjoquist

[57] ABSTRACT

A removable hose protector to prevent the unauthorized removal of a hose from a faucet assembly wherein one embodiment of the invention consists of an elongate cylinder comprised of a pair of cylinder halves having top and bottom retaining lips and pair of overlapping locking tabs for the removable insertion of an ordinary padlock therein.

3 Claims, 4 Drawing Sheets

GARDEN HOSE PROTECTOR

BACKGROUND OF THE INVENTION

The present invention relates to a device for deterring the unauthorized removal of hoses from faucets. More particularly, the invention relates to a housing which prevents the hose from being disconnected from the faucet without first unlocking the lock attached thereto.

The prior art contains numerous coupling guards, locking devices or other protective devices which are designed to prevent the unauthorized tampering with pipe connections, valves or meters. These devices may be grouped generally as tamper indicting devices, access prevention devices and removable protective devices. The present invention fits into the latter category of removable protective devices.

One patent which is illustrative of a removable type of coupling lock in U.S. Pat. No. 795,952 issued on Aug. 1, 1905 to Angeloni et al. This protective device is designed to prevent the unauthorized tampering with pipe couplings by completely enclosing the coupling nut, thereby preventing access to the nut without first removing the protective device. This device is constructed using two semi-circular halves which are connected together at one end by a hinge and at the other end by a specially designed lock. Another device of this general type is disclosed in U.S. Pat. No. 804,387 issued to Davis on Nov. 14, 1905. The Davis device is designed to prevent theft of light bulbs and as with the Angeloni patent, consists of a pair of semi-circular halves connected at one end by a hinge and at the other end with a specially designed locking mechanism.

One removable protective device which is specifically designed for protecting hose couplings is disclosed in U.S. Pat. No. 3,678,717 issued to Eaton on July 25, 1972. One embodiment of the Eaton coupling guard consists of a U-shaped member which is fitted over the hose coupling. The U-shaped member has slots in its side legs to allow a retaining bar to removably engage the U-shaped member against the hose coupling. The retaining bar is then locked into position using an ordinary lock to prevent the removal of the hose from the faucet. In the second embodiment disclosed in Eaton, the coupling guard fits within the shackle of the lock so that the body of the lock serves as the retaining member.

SUMMARY OF THE INVENTION

Many public institutions and golf courses experience a loss of hoses and sprinklers as a result of impulse decisions to steal the garden hose. Additionally, laundromats experience a great deal of vandalism due to the theft or removal of washing machine hoses. The present invention is designed to prevent this type of theft by preventing the disconnection of the hose from the faucet while allowing for the continued use of the hose and faucet, without having to remove the protective device. Finally, this device may be installed on a faucet to prevent the use of a garden hose on the faucet while the owner is away.

The present invention consists of an elongate cylinder which encloses the hose coupling. The cylinder includes a top lip which releasably engages the neck of the faucet between the faucet handle and the threaded end of the faucet. The lower end of the cylinder includes a lower lip having a diameter sufficient to allow for the normal flexing of the hose while preventing the passage of the threaded hose connector therethrough.

The invention is formed by creating a pair of essentially mirror image cylinder halves. The halves are connected together along one of their elongate sides by one or more hinges. The other elongate side of the respective cylinder halves include at least one overlapping extension on each cylinder half to allow the shackle of a lock to pass therethrough. When the lock is inserted into the extensions, the cylinder halves are prevented from opening and the top lip engages the neck of the faucet while the lower lip encloses the flexible portion of the hose.

A second embodiment is disclosed herein which utilizes a pair of elongate cylinders. These cylinders are particularly adapted for use on hoses or hose connections which utilize a snap-type coupling. The use of the second cylinder further limits accessibility to the coupling by providing a lower lip which is sufficiently distant from the coupling so that pliers or other devices may not be used to disconnect the coupling. The lower opening of the second cylinder also prevents the removal of the snap coupling therethrough. The inner cylinder is similar to the elongate cylinder of the first embodiment and consists of a pair of nearly mirror image cylinder halves. The cylinder halves are preferably connected on one side of the cylinder half by one or more hinges and include a pair of overlapping extensions on the second side of the respective cylinder halves. As with the first embodiment, the extensions are oriented in an overlapping manner to allow the shackle of a lock to pass therethrough. The inner cylinder also includes a top lip for releasably engaging the neck of a faucet. The lower end of the inner cylinder preferably has a lower lip which allows flexible movement of the hose while preventing the removal of the threaded hose connector therethrough.

The second elongate cylinder is preferably a single piece cylinder having an inner diameter slightly larger than the outer diameter of the inner cylinder. This second cylinder includes a lower lip of sufficient diameter to allow flexible movement of the hose and to allow the passage of the hose connector therethrough but is sufficiently small to prevent the removal of the snap connector through the lower opening. The top portion of the second cylinder includes an extension oriented to fit in alignment with the extensions of the inner cylinder to enable the shackle of the lock to pass through all three extensions. When the second cylinder is placed over the first cylinder, the lower lip on the second cylinder is sufficiently distant from the coupling so that even if a normal size tool were inserted through the opening of the second cylinder it would not reach the snap coupling. The use of the one piece second cylinder prevents the inner cylinder from being pried open without first removing the second cylinder and greatly adds to the overall strength and deterrence value of the invention.

DETAILED DESCRIPTION OF THE PREFERRED EMBODIMENT

Figure 1:
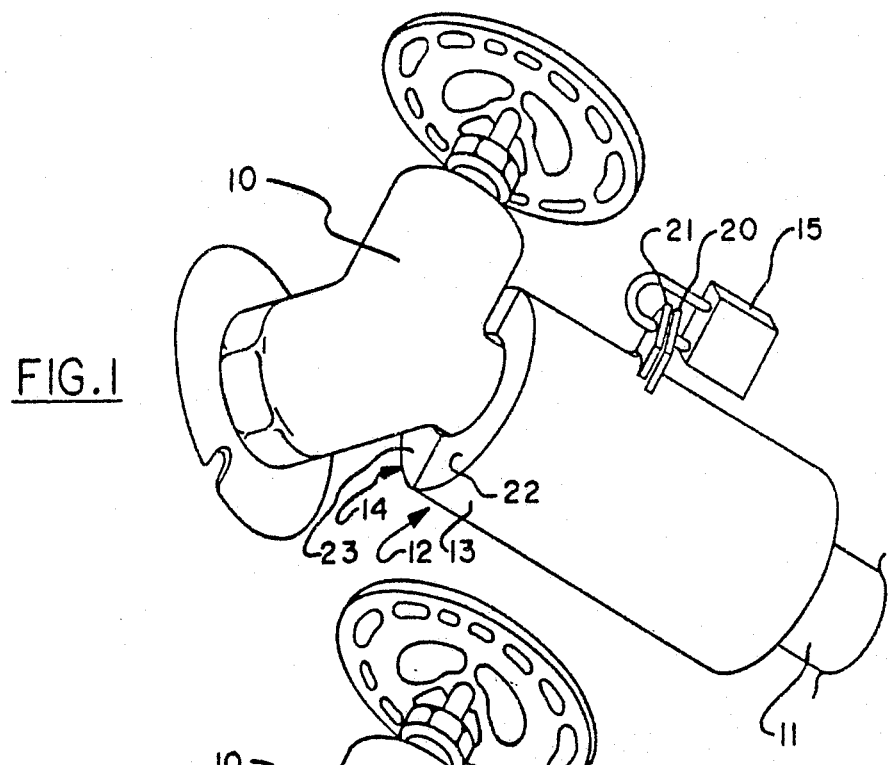
FIG. 1 is a perspective view of the garden hose protector shown in its closed position embracing the hose coupling.

In FIG. 1, a faucet assembly 10 and garden hose 11 are illustrated in their coupled relationship. The garden hose protector of the present invention is identified generally as 12 and is illustrated in the closed position. The garden hose protector 12 is comprised of a pair of elongate cylindrical halves 13 and 14, respectively. These cylinder halves, 13 and 14, are movably joined along their inner, lengthwise surface by a pair of hinges, 16 and 17. The outer lengthwise surfaces, 18 and 19, of the cylinder halves, 13 and 14, include a pair of horizontally positioned locking tabs, 20 and 21.

The cylinder halves, 13 and 14, are preferably constructed of a strong, durable plastic such as ABS plastic. The overall length of the garden hose protector 12 is preferably twice the diameter of the closed cylinder halves, 13 and 14 to enable the device to fit over any commercially available garden hose 11. As illustrated in FIG. 1, the top section of the cylinder halves, 13 and 14, include a pair of inwardly projecting, semi-circular engagement lips, 22 and 23. These engagement lips, 22 and 23, preferably extend inwardly from the top end of their respective cylinder half, 13 and 14, approximately one-third of the overall diameter of the garden hose protector 12. The lower end of the cylinder halves 13 and 14 include a pair of inwardly projecting, semi-circular retaining lips 24 and 25 which extend inwardly slightly less than the top engagement lips 22 and 23.

In the typical hose 11 and faucet assembly 10, the hose 11 includes an internally threaded connector ring 26 attached to the end of the garden hose 11. This connector ring 26 is threaded onto the externally threaded end 27 of the faucet assembly 10. To prevent the unauthorized removal of the hose 11 from the faucet assembly 10, the garden hose protector 12 is positioned adjacent the neck 28 of the faucet assembly 10. When the garden hose protector 12 is closed, the engagement lips, 22 and 23 surround the neck portion 28 of the faucet assembly 10 immediately above the externally threaded connector 27. In their closed position, the engagement lips 22 and 23 form a circular top opening 31 having a diameter slightly larger than the neck 28 of the faucet assembly and smaller than the diameter of the externally threaded connector 27 to prevent the removal of the garden hose protector 12 from the faucet assembly 10 without first opening the respective cylinder halves, 13 and 14.

The lower end of the garden hose protector 12 includes a pair of retaining lips 24 and 25 which form a lower circular opening 32 which enables the flexible portion of the garden hose 11 to pass therethrough. The diameter of the lower opening 32 formed by the retaining lips 24 and 25 is sufficient to allow a limited amount of flexibility by the garden hose 11; however, the diameter is sufficiently small to prevent the internally threaded connector ring 26 from passing therethrough. By allowing limited flexibility of the garden hose 11 through this lower opening 32, the likelihood of the garden hose protector 12 breaking or splitting due to the normal side to side movement of the garden hose 11 is prevented.

When the garden hose protector 12 is in its closed position, the locking tabs, 20 and 21 extend outwardly from the lengthwise outer surfaces, 18 and 19, of the cylinder halves, 13 and 14, in an overlapping manner. The locking tabs, 20 and 21, are positioned perpendicularly to the lengthwise dimension of the garden hose protector 12 to facilitate the placement of the shackle portion of a lock 15 through the openings, 29 and 30. The locking tabs, 20 and 21, are oriented to allow the operation of the faucet assembly 10 without interference from the garden hose protector 12. Once the shackle of the lock 15 is inserted through the openings, 29 and 30, the garden hose protector 12 cannot be removed from the faucet assembly 10 and the connector ring 26 of the garden hose 11 will not pass through the lower opening 32 of the garden hose protector 12. Finally, the lengthwise surfaces 18 and 19 may be designed to meet in an overlapping or mating relationship to further prevent the garden hose protector 12 from being pried open.

Figure 4:
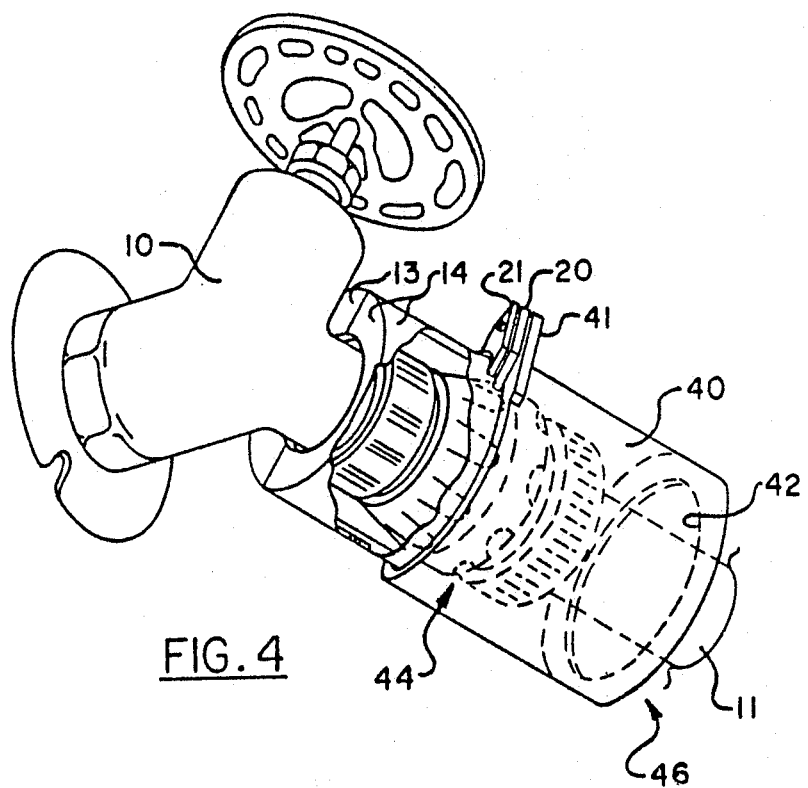
FIG. 4 is a diagramatic view of another embodiment of the garden hose protector partially cut away to illustrate the second cylinder and snap connector.
Figure 5:
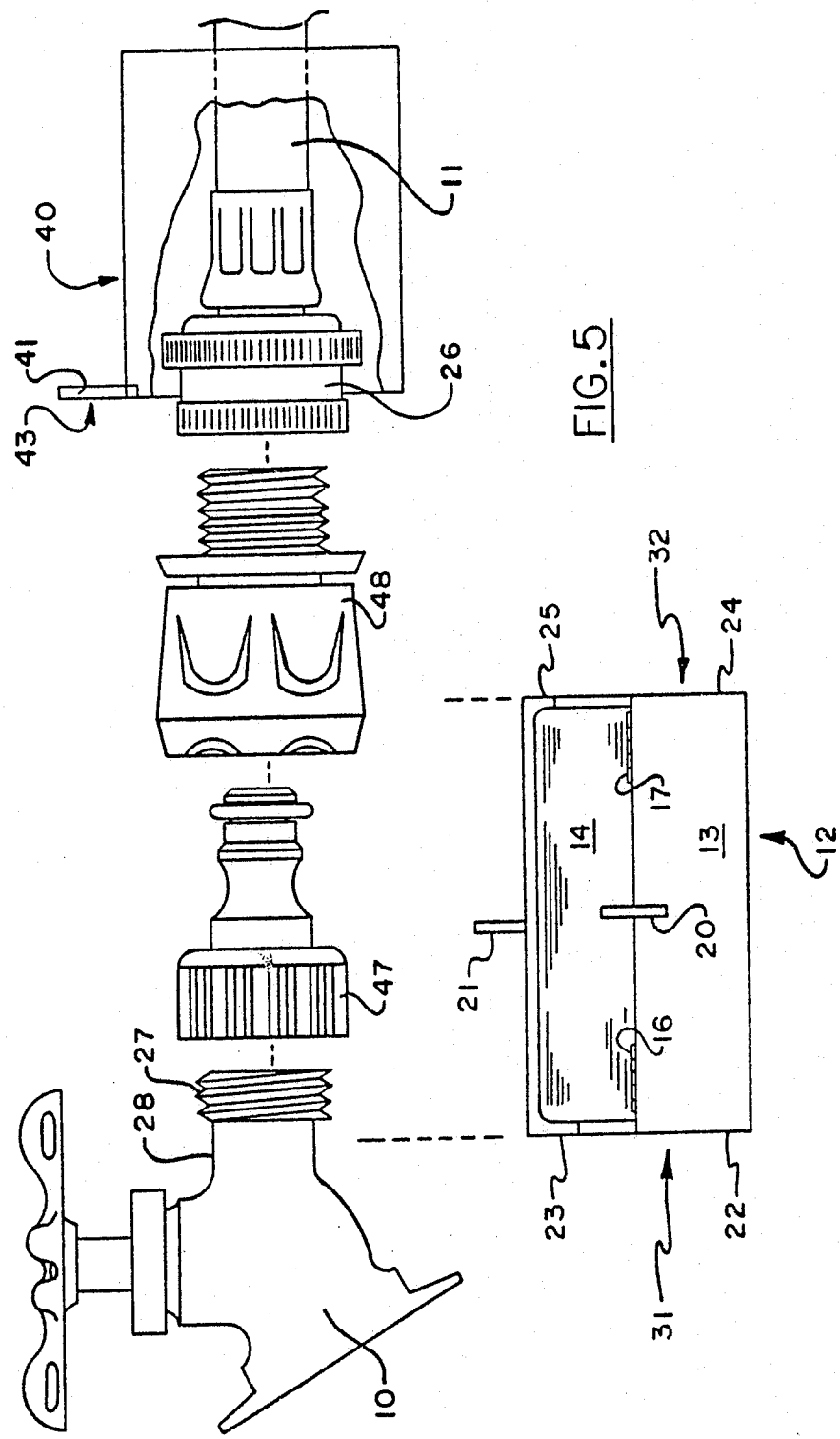
FIG. 5 is an exploded perspective view of the garden hose protector illustrated in FIG. 4.
Figure 6:
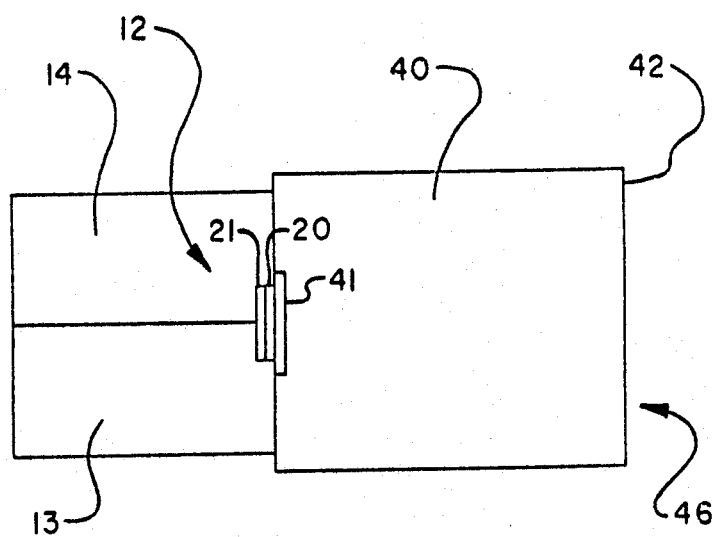
FIG. 6 is a side elevation view of the garden hose protector illustrated in FIG. 4.

A further embodiment of this invention is illustrated in FIGS. 4-6. In this embodiment, a garden hose protector 12 of the type described above, is attached to a snap-type hose coupling 44, and a second elongate cylinder 40 is added to removably surround the garden hose protector 12. This second cylinder 40 is preferably constructed of a durable plastic such as ABS plastic and consists of a one piece, elongate cylinder having a locking tab 41 horizontally positioned along its top end and a retaining lip 42 along its lower end. The inner diameter of the second cylinder 40 is slightly larger than the outer diameter of the garden hose protector 12 to enable the second cylinder 40 to slidably fit over the garden hose protector 12. The locking tab 41 and opening 43 are positioned to fit in alignment with the locking tabs 20 and 21. The retaining lip 42 projects inwardly from the lower end of the second cylinder 40 to form lower opening 46.

When the second cylinder 40 is used with a snap-type hose coupling 44, the garden hose 11 is threaded through the lower opening 46 of the second cylinder 40; the female connector 48 is attached to the connector ring 26 and then attached to the faucet assembly 10 by snapping the male connector 47 from the faucet assembly 10 into the female connector 48. The garden hose protector 12 is then positioned to engage the neck 28 of the faucet assembly 10 and enclose the snap coupling 44. Finally, the second cylinder 40 is slid over the garden hose protector 12 to prevent the halves, 13 and 14, from being opening without first removing the second cylinder 40. The shackle of a lock is then placed through the locking tab openings 29, 30 and 43 to prevent the removal of the garden hose protector 12 and the second cylinder 40.

The use of the second cylinder 40 provides a much stronger protection device which may only be defeated by removing the lock 15 and the second cylinder 40 prior to opening the cylinder halves, 13 and 14. When the second cylinder 40 is attached, the retaining lip 42 extends downwardly along the garden hose 11 further than the retaining lips, 24, and 25, of the garden hose protector 12. The retaining lip 42 of the second cylinder 40 also has a larger diameter than the retaining lips, 24 and 25, of the garden hose protector 12 to allow for the added flexibility necessary to prevent the garden hose 11 from being pinched against the retaining lip 42.

Figure 2:
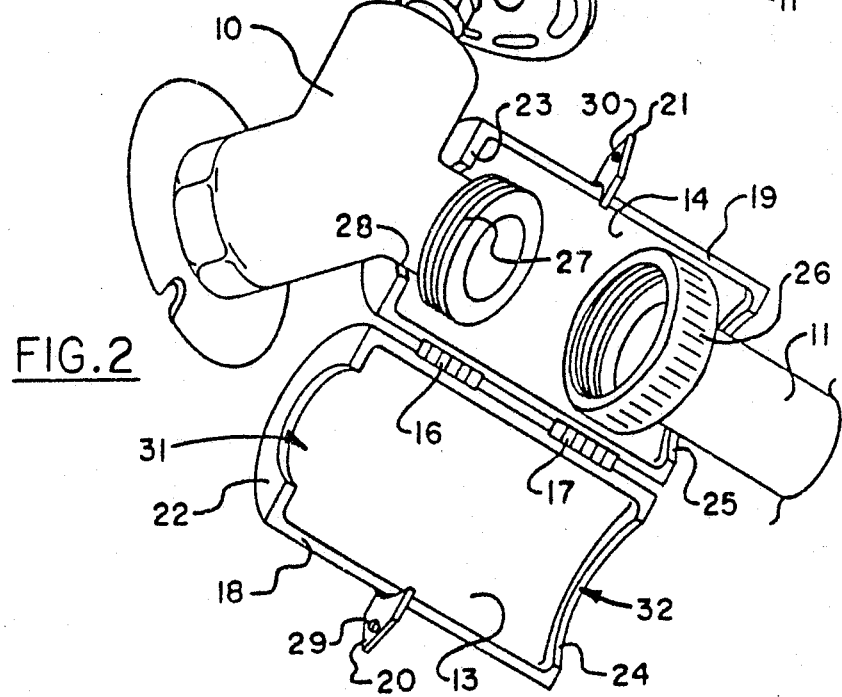
FIG. 2 is a perspective view of the garden hose protector shown in its open position.
Figure 3:
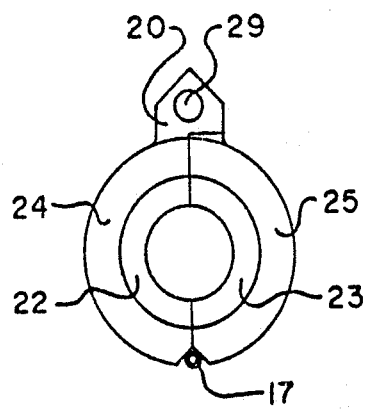
FIG. 3 is a bottom view of the garden hose protector.

The use of the extended lower retaining lip 42, enables this embodiment to be particularly useful where snap-type hose couplings 44 are used. The use of these commercially available snap couplings 44 to couple the garden hose 11 to the faucet assembly 10 creates a hose coupling which is much longer than the typical coupling illustrated in FIG. 2. The use of a snap coupling 44 allows the garden hose 11 to be disconnected from the faucet assembly 10 by merely moving a ring on the female connector 48 downwardly away from the faucet assembly 10. The diameter of the retaining lip 42 prevents the removal of the femal connector 48 on the snap coupling 44 through the lower opening 46 of the second cylinder 40. Therefore, a person tampering with a garden hose 11 which is connected to a faucet assembly 10 by a snap coupling 44 may be able to unsnap the hose coupling; however, they will not be able to remove the garden hose 11 without first removing the shackle of the lock 15 from the locking tabs 20, 21 and 41. Additionally, the use of the retaining lip 42 on the second cylinder 40 prevents the disconnection of the hose coupling by pliers or other such tools by limiting access through the lower opening 46 of the second cylinder 40. When the retaining lip 42 of the second cylinder 40 is utilized, the retaining lips, 24 and 25, may be eliminated because the retaining lips, 24 and 25, provide only a limited amount of additional protection.

That which is claimed is:

1. A garden hose protection device for removably protecting the coupling of a garden hose with a faucet assembly wherein the protection device comprises;

first and second elongate cylinders, said first elongate cylinder being comprised of a pair of hingedly connected cylinder halves having top and bottom ends and elongate sides, said top end of said cylinder halves having an inwardly directed pair of retaining lips for releasably engaging the neck portion of a faucet assembly when said cylinder halves are moved to a closed position, at least one locking tab on one elongate side of each cylinder half, said locking tabs being oriented on their respective cylinder half to form an overlapping relationship when said cylinder halves are moved to a closed position, said second elongate cylinder having an inner diameter sufficient to encircle said first elongate cylinder when said cylinder halves are in said closed position, said second cylinder having top and bottom ends, a locking tab positioned adjacent to said top end of said second cylinder wherein said locking tab is oriented to fit in alignment with the locking tabs of said first cylinder, the bottom end of said second cylinder having an inwardly directed retaining lip to prevent the removal of a snap type coupling therethrough.

2. The protection device of claim 1, wherein the bottom end of said first cylinder includes an inwardly directed retaining lip thereon to prevent the removal of a garden hose therethrough.

3. The protection device of claim 1, wherein the respective locking tabs have openings therein for the removable insertion of a lock to prevent the removal of the protection device from the coupling.

* * * * *